H. C. HUBBELL.
STORAGE BATTERY ELECTRODE AND PROCESS OF MAKING SAME.
APPLICATION FILED JUNE 6, 1911.

1,087,236.

Patented Feb. 17, 1914.

WITNESSES:

INVENTOR.
Harry C. Hubbell
BY
ATTORNEY.

UNITED STATES PATENT OFFICE.

HARRY CROSS HUBBELL, OF NEWARK, NEW JERSEY.

STORAGE-BATTERY ELECTRODE AND PROCESS OF MAKING SAME.

1,087,236. Specification of Letters Patent. Patented Feb. 17, 1914.

Application filed June 6, 1911. Serial No. 631,557.

*To all whom it may concern:*

Be it known that I, HARRY CROSS HUBBELL, a citizen of the United States, residing at Newark, in the county of Essex and State of New Jersey, have invented certain new and useful Improvements in Storage-Battery Electrodes and Processes of Making Same, of which the following is a specification.

My present invention relates to an improved storage battery electrode which is oxidized on discharge, being specifically a plate of special construction wherein cadmium oxid is the active material.

It further relates to the process for making said plate.

Figure 1:
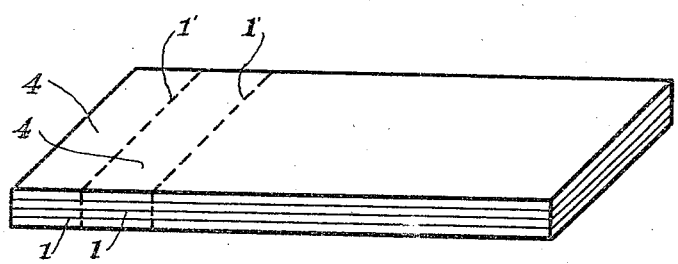
Figure 2:
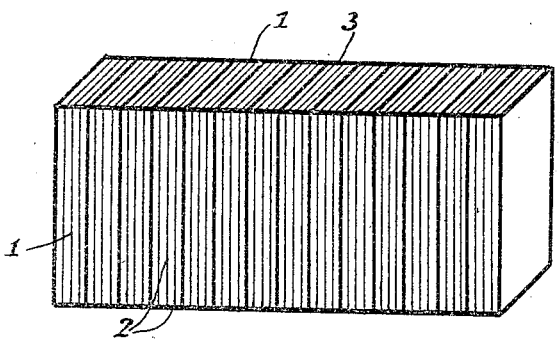

In the drawings, Figure 1 shows a plate consisting of alternate layers of different metals; and Fig. 2 shows this plate after it has been cut up into bars 1, as along the lines 1' of Fig. 1, and after these bars have been rearranged to form a storage battery plate wherein the layers are disposed edgewise to the faces 2 and 3 of the plate, that is, in Fig. 2 the surfaces 4—4 are placed in abutment.

I will now describe my improved electrode-plate and the process for its manufacture, reserving it to the claims to point out the novel features and to define the scope of the invention, it being understood that the claims will be interpreted to have the due range of equivalents to which they may be entitled in view of the art.

I will first describe the process of making the preferred form of plate within the present invention, wherein nickel strips alternate with cadmium oxid.

I start with a sheet made up in any preferred manner of alternate layers of cadmium and nickel, the layers being preferably of film-like thickness. An obvious way of making the sheet will be by successive electro depositions of the metals until the desired aggregate thickness for the sheet is reached. I then cut up this sheet into bars which I then arrange side by side in the shape of the finished electrode-plate, with the layers of the bars directed edgewise to the faces of said plate. Each set of ends of the bars are then integrally united, preferably by fusing them with an oxy-hydrogen or acetylene flame so that each set of ends are in perfect electrical connection along the side edges of the plate. Another method of uniting the bars is by binding them together in a surrounding frame of a suitable metal, such as nickel. Here again, however, the ends of the bars are preferably fused to the nickel frame to insure perfect electrical connection.

A convenient size for the electrode-plate is about one inch by five inches by three-sixteenths of an inch thick.

In passing I may say that the mechanical features of obtaining the so-called bars from the sheet and their assembling into a plate with their layers disposed edgewise to the superficies are the same as illustrated in my co-pending United States application, Serial No. 631,271, filed June 5, 1911.

I now convert the cadmium layers into active material. For example I may heat the plate to a dull heat in the air preferably below the melting point of cadmium, the heating being preferably accomplished on a hot plate. This converts the cadmium layers into cadmium oxid, and I then have a cadmium plate ready for use as part of an electrode wherein the cadmium active material is in intimate contact with conducting strips of nickel.

Instead of oxidizing the cadmium by the agency of heat I may oxidize it electrolytically by making the plate an anode in a suitable electrolyte.

Instead of alternating the cadmium with layers of nickel I may substitute for the nickel another more electro-negative metal in an alkaline electrolyte than cadmium, such as cobalt, iron, tin, copper, in which event these latter metals constitute conducting strips, arranged in face to face parallelism, disposed edgewise to the faces of the plate and being separated by intermediate layers of cadmium oxid.

What I claim is:

1. A storage battery electrode comprising a plate consisting of numerous thin conducting strips of a suitable metal electro-negative to cadmium in an alkaline electrolyte, said strips being arranged in close face to face parallelism disposed edgewise to the faces of the plate and being separated by intermediate layers of cadmium oxid.

2. The process of making storage battery electrodes consisting in uniting into a plate alternate layers of cadmium and of a metal electro-negative to cadmium in an alkaline electrolyte with the layers disposed edgewise to the faces of the plate, and oxidizing the cadmium layers.

3. The process of making storage battery electrodes consisting in uniting into a plate alternate layers of cadmium, and of a metal electro-negative to cadmium in an alkaline electrolyte with the layers disposed edgewise to the faces of the plate, and oxidizing the cadmium layers by heating the plate in the presence of oxygen to a temperature below the melting point of cadmium.

In testimony whereof I have affixed my signature in presence of two witnesses.

HARRY CROSS HUBBELL.

Witnesses:
E. W. SCHERR, Jr.,
ALAN C. McDONNELL.

Copies of this patent may be obtained for five cents each, by addressing the "Commissioner of Patents, Washington, D. C."